(12) United States Patent
Ishihara et al.

(10) Patent No.: US 6,880,975 B2
(45) Date of Patent: Apr. 19, 2005

(54) LINEAR MOTION GUIDE UNIT

(75) Inventors: Toyohisa Ishihara, Gifu-ken (JP); Yoshiharu Miyata, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 234 days.

(21) Appl. No.: 10/372,770

(22) Filed: Feb. 26, 2003

(65) Prior Publication Data

US 2003/0161557 A1 Aug. 28, 2003

(30) Foreign Application Priority Data

Feb. 26, 2002 (JP) .................................... 2002-049829

(51) Int. Cl.$^7$ .................... F16C 29/06; F16C 19/00
(52) U.S. Cl. ...................... 384/45; 384/43; 384/51
(58) Field of Search ........................ 384/43, 44, 45, 384/49, 50, 51, 52, 55

(56) References Cited

U.S. PATENT DOCUMENTS

| | | | |
|---|---|---|---|
| 4,557,530 A | | 12/1985 | Haase |
| 4,797,012 A | * | 1/1989 | Tanaka .................. 384/45 |
| 5,289,779 A | | 3/1994 | Ohya et al. |
| 5,308,164 A | * | 5/1994 | Tanaka .................. 384/13 |
| 5,340,219 A | | 8/1994 | Agari |
| 5,649,769 A | | 7/1997 | Agari et al. |
| 5,927,858 A | * | 7/1999 | Agari .................... 384/45 |
| 5,947,605 A | * | 9/1999 | Shirai ................... 384/45 |
| 5,993,064 A | * | 11/1999 | Teramachi et al. ....... 384/43 |
| 6,113,272 A | * | 9/2000 | Michioka et al. ........ 384/15 |
| 6,116,783 A | * | 9/2000 | Shirai et al. ........... 384/43 |
| 6,152,602 A | * | 11/2000 | Honma et al. .......... 384/45 |
| 6,191,548 B1 | * | 2/2001 | Kajita et al. ........ 318/568.18 |
| 6,682,218 B1 | * | 1/2004 | Ishihara ............... 384/45 |
| 6,729,761 B1 | * | 5/2004 | Matsui et al. .......... 384/45 |

FOREIGN PATENT DOCUMENTS

| | | |
|---|---|---|
| EP | 1069042 A | 1/2001 |
| JP | 11-30234 | 2/1999 |
| JP | 2001-12465 | 1/2001 |

* cited by examiner

Primary Examiner—David A. Bucci
Assistant Examiner—Colby Hansen
(74) Attorney, Agent, or Firm—Browdy and Neimark, P.L.L.C.

(57) ABSTRACT

A linear motion guide unit has a track rail of a pair of side walls on which raceway grooves are formed. In the depths or bottom of the raceway grooves there are cut deeply relief flutes, one to each raceway groove, where retainer bands to keep rolling elements against coming apart are allowed to step aside therein. The raceway groove is made in so specific form as to make it possible to produce the raceway groove and do the relief flute at the same time. The retainer band is installed in the slider, with stepping aside in the relief flute for linear movement relative to the track rail as the slider travels along the track rail. The relief flute is cut in a fashion at least one lengthwise flank thereof on the side nearer the upward opening between the side walls of the track rail is made slantwise to provide a tapered flank because of which the relief flute can be produced together with the associated raceway groove at a single process.

20 Claims, 10 Drawing Sheets

(E)

(F)

LINEAR MOTION GUIDE UNIT

BACKGROUND OF THE INVENTION

1. Field of the Invention

The present invention relates to a linear motion guide unit having wide application in sliding parts incorporated in, for example, assembling machines including semiconductor manufacturing equipments and so on, numerically controlled machine tools, measuring instruments, testing machines and the like. More particularly, it relates to a linear motion guide unit in which a slider is forced to move lengthwise along a track rail.

2. Description of the Prior Art

Linear motion guide units have been universally recognized for fundamental and versatile means to more encourage the recently remarkable growth of mechatronics. Although the linear motion guide units have been extensively built in machinery in fields as diverse as assembling machines including semiconductor manufacturing equipments and so on, numerically controlled machine tools, measuring instruments, testing machines and the like, the expansion of uses accompanied by the current developments in advanced technologies requires more and more such linear motion guide units that can manage growing demands for high precision, low-frictional resistance, high-speed moving, easy assemblage, versatility and the like.

There is conventionally known a linear motion guide unit of the sort disclosed in, for example Japanese Patent Laid-Open No. 11-30234, which is a co-pending application filed by the present assignee. With the prior linear motion guide unit or slider unit, a recirculating-ball screw is accommodated in a track rail of U-shape in cross section and an upper seal is provided to close a clearance left between an upper face of a raceway groove on a slider and the track rail. Moreover, the track rail in the prior linear motion guide unit recited just above is composed of a pair of widthwise opposing sides and a bottom joined together to form an upward opened recess of U-shape in cross section, while the track rail remains left coarse on its inside surface coming in sliding engagement with the lip of the upper seal mounted on the slider. This means it is very tough to move smoothly the slider, so that the sealing effect would be vulnerable.

Japanese Patent Laid-Open No. 2001-12465, which is also a co-pending application filed by the present assignee, discloses another example of the linear motion guide unit having the track rail of U-shape in cross section, which has the widthwise opposing sides made on inside surfaces thereof with raceway grooves. With the prior linear motion guide unit stated earlier, the track rail and the slider are respectively made on their sides with surfaces of reference, which are instrumental in setting the track rail and the slider on any machine bed and table in their precise positions respectively, keeping the working table against any deviation in position and any change in posture with respect to the machine bed. The track rail is fixed to the machine bed with fastening bolts, with the side and bottom surfaces of reference coming into face-to-face abutment to their associated mating side and top surfaces of the machine bed, one to each mating surface, in their precise positions. The slider is also mounted at a slider head thereof to the working table with fastening bolts, with the side and upper surfaces of reference being brought into face-to-face engagement with their associated mating side and lower surfaces of the table, one to each mating surface, in their precise positions.

In a current reality, moreover, the linear motion guide unit is expected to be less expensive, even with high precision.

With the linear motion guide unit of the sort constructed as disclosed in the reference cited earlier, the convexities bulged sidewise out of the sides of the track rail is small or narrow in width. This means that the track rail is unsteady in machining and, therefore, too troublesome in machining process to process it with accuracy. In particular, the rolling elements or balls, as could not be kept in place with the slider of itself, would come apart after the slider has been demounted from the track rail. Thus, the slider, just after taken apart from the track rail, has to be transferred to any dummy track rail of U-shape in cross section, which has been ready in advance for replacement for real one. This means that mounting the linear motion guide unit onto various machines needs many chores for handling work of the linear motion guide unit.

Combination of a track rail 61 and a slider 62 as shown in FIG. 16, moreover, has been known for the linear motion guide unit. The track rail 61 has a pair of widthwise opposing sides 63 extending in parallel with one another, which are made outside thereon with lengthwise raceway grooves 67, one to each side. The track rail 61 is made therein bolt holes 66 open to a top face 65 thereof, which are used to fasten the track rail 61 to a machine bed, and so on. The slider 62 fits over the top face 65 of the track rail 61 and conforms in cross section to the track rail 61, and also made up of a carriage 64, end caps 68 attached on forward and aft ends of the carriage 64, one to each end, and end seals 69 arranged on outside ends of the end caps 68 to close clearances left between the end caps 68 and the track rail 61. The end caps 68 together with the end seals 69 are fastened to the carriage 64 with screws that extend across through-holes 86 into fastening holes 92. Lower seals 72 are laid to extend underneath both the carriage 64 and the end caps 68. The carriage 64 is moreover made with raceway grooves 73 extending forward-and-aft in opposition to the raceway grooves 67 on the track rail 61, and also made therein threaded holes opened to a top surface 75. The slider 62 is allowed to move in a sliding manner relatively to the track rail 61 by virtue of rolling elements 78 or balls that rolls through a load raceway 77 defined between the raceway groove 67 of the track rail 61 and the confronting raceway groove 73 on the carriage 64. A retainer band 78 is arranged to fit in a lengthwise relief flute 70 cut deeply into the raceway groove 67 on the track rail 61, continuing to keep the rolling elements 78 in the carriage 64 even after the slider 62 has been taken apart from the track rail 61. The rolling elements 78 are incorporated in the linear motion guide unit in a way rolling through a recirculating circuit that is comprised of the load raceway 77, and a non-loaded area including a return passage 80 formed in the carriage 64 and turnarounds made in the end caps 68 to communicate the return passage 80 with the associated load raceway 77. The slider 62 has a grease nipple 74 for applying lubricant to the recirculating circuit, which is attached to any one of the end caps 68, with extending outside from the associated end seal 69.

The slider 62 with the retainer band 79 is common in the linear motion guide unit of the type in which the slider 62 fit over astride the track rail 61. With the linear motion guide unit constructed as stated earlier, the lengthwise relief flute 70 to fit snugly the retainer band 79 therein is cut in the sidewise opposite outside surfaces 63 on the track rail 61 of rectangular shape in cross section. As the raceway grooves 67 are cut in the lengthwise sides 63 or the external areas of the track rail 61, imparting specific forms including the raceway grooves 67 and the deep relief flutes 70 to the lengthwise sides or the external surface areas of the track rail 61 can be easily realized by just moving a grinding wheel large in diameter against the associated external surface area in a direction at right to the external side 63. Moreover, the lengthwise relief flute 70 to fit the retainer band 79 therein can be readily produced to a desirable specific form.

With the track rail of the sort in which sidewise spaced upright side walls are joined together along their lengthwise underside edges through a lengthwise bottom to form an U-shape in cross section, by the way of contrast, the raceway grooves must be cut in sidewise opposing inside surfaces of the upright side walls, to which the grinding wheel is less accessible compared with the externally exposed outside surfaces. To manage the design consideration as stated earlier, the large-size grinding wheel to produce the raceway grooves on the side walls must enter between the confronting upright side walls in a tilting posture to work around the side walls. Cutting the relief flute to fit the retainer band in there has been proven even tougher because the relief flute has to be cut in the depths or the bottom of the raceway groove. The second alternative would be considered that the relief flute is cut prior to hardening process with the use of any cutter small in diametral size. Nevertheless, it is a disadvantage of the alternative stated just earlier that the relief flute could not be cut with precision throughout the overall length because the track rail is too long to ignore the stress or the like, which is largely the result of previous hardening steps. This has been proven to give rise to a major problem that the relief flute would be made unnecessarily large in dimension to avoid coming into interference with the retainer band, resulting in getting the side walls of the track rail small or weak in strength in traverse direction.

With the linear motion guide unit having the track rail of U-shape in cross section made overall shrunk in construction, it still remains a major challenge to realize how to secure an area in the track rail to fit the retainer band into there without any occurrence of interference between the track rail and the retainer band out when the slider travels along the track rail. Moreover, it has been expected to more quickly and precisely mount the worktable to the slider and also the stationary bed to the track rail respectively at a preselected mounting position and posture, and further make certain that the slider may move relatively to the track rail in a smooth sliding manner with less friction whereby the slider and the track rail are ensured to keep their mounting positions and postures preselected with respect to, for example the worktable and the machine bed, respectively, even after a prolonged period of use.

SUMMARY OF THE INVENTION

The present invention, therefore, has as its primary object to overcome the problem as described just above and more particular to provide an improved linear motion guide unit in which a relief flute cut into the depths of a raceway groove on a track rail to provide an area where a retainer band is allowed to step aside therein is made specific form so as to make it possible to produce the raceway groove and do the relief flute at the same time, using a grindstone that enters between confronting side walls of the track rail. Moreover, the present invention provides an improved linear motion guide unit in which the side walls of the track rail are bulged sidewise out of outside surfaces thereof to provide sidewise raised surfaces above side walls, one to each side wall, which are made large in width enough to serve for surfaces of reference to make it easy to set precisely the track rail on a fixed bed including a machine bed, base of instruments, and so on at a preselected position, and further in which the side walls of the track rail are made on widthwise opposing inside surfaces thereof with lengthwise recesses in which upper seals of a slider fit for sliding movement so as to make sure of low frictional resistance that might be encountered when the slider moves over the track rail, allowing rolling elements to run smoothly through a recirculating circuit.

The present invention is concerned with a linear motion guide unit comprising; a track rail having a pair of side walls extending lengthwise in parallel with one another, the side walls being made on their sidewise opposing inside surfaces with first raceway grooves, one to each inside surface; a slider movable lengthwise along the track rail in a guiding way made open between the side walls of the track rail, the slider being made thereon with second raceway grooves in opposition to the first raceway grooves; and rolling elements running through a load raceway defined between the confronting first and second raceway grooves; wherein a retainer band is installed in the slider to keep the rolling elements in the slider, while a relief flute is cut deep in the first raceway groove in a way extending lengthwise along the first raceway groove, and wherein the retainer band on the slider fits in the relief flute for relative movement as the slider travels relatively to the track rail.

In one aspect of the present invention, there is provided a linear motion guide unit in which the relief flute where the retainer band is allowed to step aside therein is cut together with the associated raceway groove at a time. To let produce the relief flute concurrently with the raceway groove at a single process, in another aspect of the present invention, there is disclosed a linear motion guide unit in which the relief flute where the retainer band is allowed to fit therein is cut in a fashion at least one lengthwise flank thereof on a side nearer an opening between the side walls of the track rail is made slantwise to provide a tapered flank. Moreover, a linear motion guide unit is disclosed in which the relief flute is cut lengthwise in such a fashion that a slant angle of the upper tapered flank is more than a slant angle of a lower flank.

In another aspect of the present invention, a linear motion guide unit is disclosed in which the track rail is comprised of a pair of side walls and a bottom connected integrally with the side walls along lower edges of the side walls to define an upward opened recess of U-shape in cross section. In another aspect of the present invention, there is disclosed a linear motion guide unit in which the first raceway grooves are cut in sidewise opposing inside surfaces of the side walls of the track rail, just one to each inside surface. Moreover, a linear motion guide unit is disclosed in which a separator is installed between any two adjacent rolling elements.

In another aspect of the present invention, there is provided a linear motion guide unit in which the slider is comprised of a carriage made on widthwise opposite sides thereof with the second raceway grooves, one to each side, end caps arranged on forward and aft ends of the carriage, and end seals attached on outside faces of the end caps, one to each cap. Moreover, a linear motion guide unit is disclosed in which forward and aft ends of the retainer band are bent at right angle with a lengthwise direction of the retainer band to provide bent ends each of which fits in a groove cut in the outside face of the end cap. In a further another aspect of the present invention, a linear motion guide unit is disclosed in which tips of the bent ends of the retainer band is bent back to extend towards each other along the lengthwise direction of the retainer band, coming into engagement with a slot formed in the middle of the end cap.

In another aspect of the present invention, there is provided a linear motion guide unit in which the track rail is to be fastened to a fixed bed, and the side walls of the track rail are each made on sidewise outside surface thereof with a bulged portion having a width across from a lower surface of the side wall to a level above the center of gravity of the track rail, the bulged portion having a surface finished in a surface of reference matching a mating surface of reference on the fixed bed.

In another aspect of the present invention, there is provided a linear motion guide unit in which the slider has an upper seal to close a clearance left between a fore-and-aft side of the slider and a lengthwise inside surface of any one of the side walls of the track rail, while a recess is cut in the inside surface of the side wall in a way extending lengthwise of the track rail so as to allow the upper seal to come in sliding contact at a lip thereof with the recess. Moreover, a linear motion guide unit is disclosed in which the lengthwise recesses are made in parallel with the raceway grooves on the inside surfaces of the side walls of the track rail and at the same time cutting the-raceway grooves in the inside surfaces. In a further another aspect of the present invention a linear motion guide unit is disclosed in which the upper seal is comprised of a metal backing plate arranged in a manner coming in abutment against the carriage and the end caps, and an elastic member with the lip fastened to the metal backing plate.

In another aspect of the present invention, there is provided a linear motion guide unit in which the carriage is made therein with a return passage where the rolling elements are allowed to run through there; the end cap is made therein a turnaround to connect the load raceway to the return passage, getting the rolling elements turning about there in their running direction; the separator is interposed between any two adjacent rolling elements to travel accompanied with the rolling elements, the separator having a circular periphery and axially opposing end faces made concaved to fit over the adjacent rolling elements, one to each end face; and a relief gutter extending along a curvature of the turnaround is cut deep in an inside curved surface of the turnaround in the end cap to avoid any interference of the moving separator with the turnaround.

In another aspect of the present invention, there is provided a linear motion guide unit in which the end cap is provided on sidewise opposite sides thereof with leading beak, one to each side, which fit in the relief flutes of the track rail to make sure of smooth transfer of the rolling elements between the load raceways and the turnarounds. Moreover, a linear motion guide unit is disclosed in which the end cap is composed of a spacer to be fastened on any one of the forward and aft ends of the carriage and a major end-cap part to be installed on the carriage in a way interposing the spacer between the carriage and the major end-cap part, and wherein the spacer has a spacer lug to define a radially inside curved half of the turnaround while the major end-cap part is made therein with a radially outside curved half of the turnaround.

In another aspect of the present invention, there is provided a linear motion guide unit in which the spacer lug is constructed integrally with the spacer, so that just putting the spacer in a recess formed in the major end-cap part results in joining them together with one another thereby producing the turnaround. Moreover, a linear motion guide unit is disclosed in which the relief gutter extending along the curvature of the turnaround is cut deep in the middle of the radially inside curved surface of the turnaround, which is formed on the spacer lug of the spacer.

In another aspect of the present invention, there is provided a linear motion guide unit in which a positioning pin to set the spacer with the spacer lug in precise location with respect to the carriage is made on the back of the spacer lug, which is to mate with any one of the forward and aft ends of the carriage, and wherein the positioning pins fit in matching holes formed in the ends of the carriage.

In another aspect of the present invention, there is provided a linear motion guide unit in which the major end-cap part has an outside half of a tubular connector, which is to fit in a socket at any one of forward and aft open ends of the return passage in the carriage while the spacer has an inside half of the tubular connector, which is to fit in a socket at any one of forward and aft open ends of the return passage in the carriage, and wherein the inside and outside halves mate with one another to communicate with the return passage.

In a further another aspect of the present invention, there is provided a linear motion guide unit in which the bottom of the track rail is made therein with bolt holes, in which bolts fit to fasten the track rail to the bed, while the slider is provided at an upper surface thereof with threaded holes that are used to fasten a table thereto.

With the linear motion guide unit constructed as stated earlier, the track rail is made in an U-shape in cross section while a retainer band is installed in a slider movable relatively to the track rail. This construction provides the significant benefit that the slider is easy to handle or use even when needs to swap the track rails or replace it with other one. Especially, the relief flute to allow the retainer band to step aside therein is made in a specific form enabling the grindstone to cut the relief flute concurrently with the associated raceway groove at a single process, and in doing so getting out of the sophisticated process of cutting the relief flutes into the depths of the raceway grooves on the widthwise opposing inside surfaces of the side walls standing side-by-side to form the track rail of U-shape in cross section.

In accordance with the linear motion guide unit of the present invention in which the retainer bands installed in the slider are allowed to fit in the relief flutes cut deep into the side walls paired to form the track rail as stated just earlier, the relief flute is cut in a fashion one lengthwise flank thereof on the upper side nearer the upward opening between the side walls is made slantwise to provide a tapered flank, because of which the grindstone is permitted to enter between the side walls through the upward opening of the U-shape track rail, producing the relief flutes on the inside surfaces of the side walls of the track rail and at the same time cutting the raceway grooves in the same inside surfaces. Thus, the retainer band is ensured smooth travel without getting interference from the track rail as the slider moves back and forth in a sliding manner with respect to the track rail. Moreover, the retainer band can keep the rolling elements correctly against coming apart.

With the linear motion guide of the present invention in which the sidewise bulged portions above the side walls of the track rail is made to have the surface of reference of the width spreading across the center of gravity of the track rail, just lying the surface of reference on any bulged portion down on the mating surface of reference on the fixed bed in face-to-face contact relation is sufficient to set quickly and easily the track rail to the bed in a high-precise position. Moreover, the bulged portions out of the track rail are allowed to make easily, quickly and inexpensively their sidewise outside surfaces into a surface of reference for mounting. Thus, the slider can be ensured in its high-precise travel with respect to the track rail. In addition to the construction as stated earlier, the recesses cut in the inside surfaces of the side walls of the track rail, one to each inside surface, along the moving direction of the slider enable the upper seals on the slider to travel fore-and-aft with keeping sliding engagement with the recesses in a way less subjected to any resistance, thereby making certain of smooth movement of the slider relatively to the track rail.

With the linear motion guide unit according to the present invention, eventually, the track rail set on the fixed bed, with the aid of the surface of reference, in preselected position and posture helps make certain of keeping the worktables or the like fastened to the slider at their desired posture with accuracy even after the slider has traveled along the track rail. This makes it possible to hold precisely the works, parts, instruments and so on in their preselected position and posture, which are desirable on processing, assembling and conveying the works and parts in any of semiconductor manufacturing machines, testing instruments, measuring appliances, processing machines, assembling machines and the others where the linear motion guide unit is used.

With the linear motion guide unit of the present invention, moreover, the relief gutter cut circumferentially into the radially inside curved surface of the turnaround enables the separators to negotiate the turnaround without getting out of the interference with the circumferential surface inside the turnaround. The presence of the relief gutter in the radially inside curved surface of the turnaround helps enable each rolling element embraced in between any two adjoining separators to roll through the recirculating circuit without less subjected to deviation due to any centrifugal force exerted on the separators during their travel, and also without causing any chatter or rattling between the rolling elements and the separators, even though the linear motion guide unit is used at any posture of the vertical, upside down, and so on rather than the horizontal. Thus, the linear motion guide unit constructed according to the present invention makes certain that the rolling elements with the separators can travel steady, smoothly through the recirculating circuit with less noise or vibration, and less wear, thereby implementing the growing demands for high speed, high accuracy, high-cycle operation, and so on of the machines where the linear motion guide unit is used.

DETAILED DESCRIPTION OF THE PREFERRED EMBODIMENTS

Figure 1:
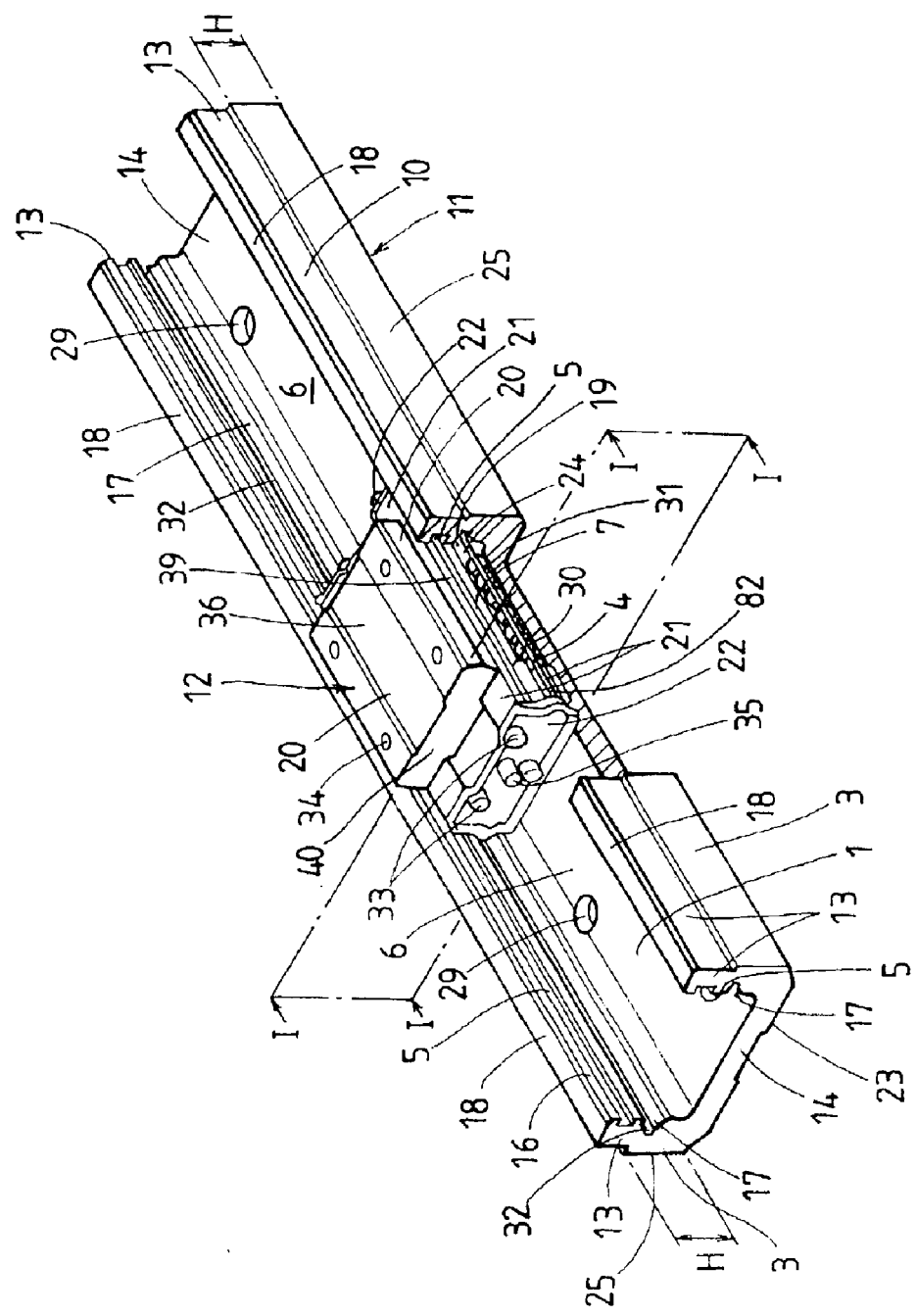
FIG. 1 is a perspective view, partially broken away, showing a preferred embodiment of a linear motion guide unit in accordance with the present invention.

A preferred embodiment of a linear motion guide unit according to the present invention will be explained hereinafter in detail with reference to the accompanying drawings. The linear motion guide unit of the present invention is envisaged to use it in sliding parts incorporated in, for example, assembling machines including semiconductor manufacturing equipment and so on, numerically controlled machine tools, measuring instruments, testing machines and the like, and thus comprised of an elongated track rail 11 set on a fixed bed 2 including a base of instrument, a machine bed, and so on at preselected precise position, and a slider 12 allowed traveling lengthwise with respect to the track rail 11. The linear motion guide unit is principally comprised of the elongated track rail 11 having a pair of side walls 13, 13 extending in parallel with one another and having first raceway grooves 17 on their sidewise opposing inside surfaces 16, one to each surface, and a slider 12 accommodated in the track rail 11 for sliding movement relatively to the track rail 11 and made thereon with second raceway grooves 24 in opposition to the first raceway grooves 17, and rolling elements 30 allowed running through a load raceway 19 defined between the confronting first and second raceway grooves 17, 24.

This elongated track rail 11 is formed to have an overall U-shape in cross-section, which is defined by a pair of widthwise opposing side walls 13 and a bottom 14 connecting integrally the side walls 13 along their lower edges with one another. The slider 12 is accommodated for sliding movement in an elongated recess opened upwards at 1 between the side walls 13 to provide a guide channel 6 along which the slider 12 is allowed to move lengthwise relatively to the track rail 11. Really the slider 12 can fit in the guide channel 6 through any one of forward and aft open ends of the track rail 11. With the linear motion guide unit constructed as stated earlier, the track rail 11 can be made large in strength and stiffness while the slider 12 is allowed traveling steady throughout the track rail 11.

The track rail 11 is also made in the bottom 14 thereof with bolt holes 29 in which bolts, not shown, fit to fasten the track rail 11 to the fixed bed 2 including any base of machinery, machine bed, and so on. Moreover, the slider 12 is provided at an upper surface 36 thereof with threaded holes 34 that are used to fasten a table including various instruments, not shown, to the slider 12. Thus, the table having thereon instruments can travel relatively to the fixed bed 2 as the slider 12 moves in a sliding manner with respect to the track rail 11. Although but only one slider 12 is shown in the track rail 11 in the illustrative embodiment of FIG. 1, it will be appreciated that any number of sliders 12 may be arranged for the track rail 11. Generally speaking, the track rail 11 is made reduced as low as possible in height to make the linear motion guide unit compact or slim in construction.

Figure 2:
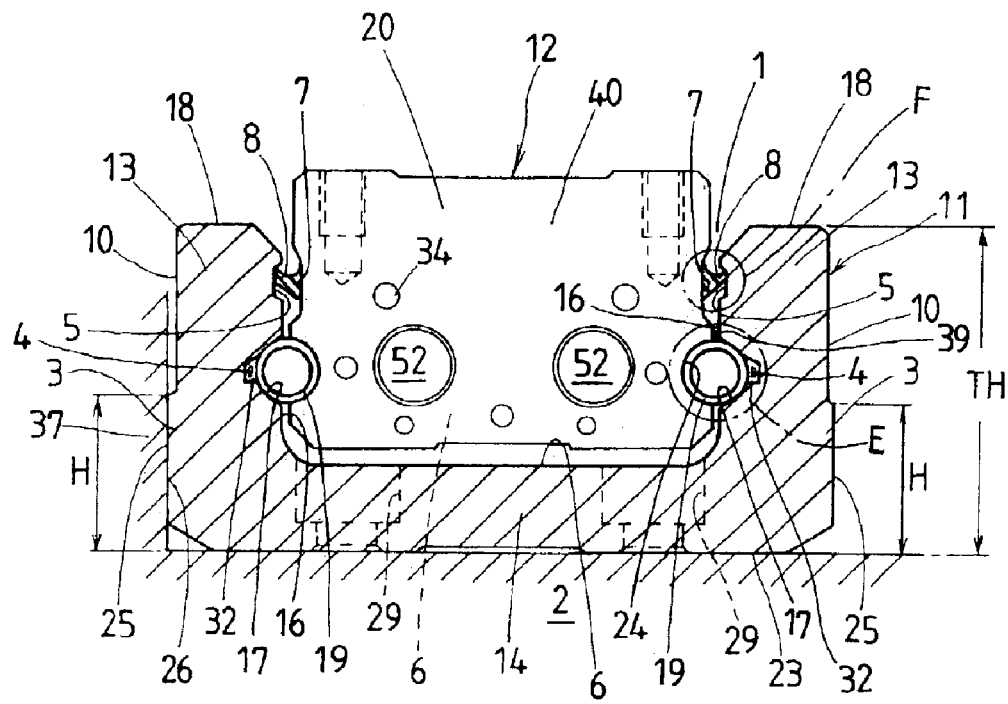
FIG. 2 is a cross-section of the linear motion guide unit of FIG. 1, taken along an arrows I—I of the same figure; and FIGS. (E) and (F) are fragmentary enlarged views of areas encircled with E and F in FIG. 2, respectively.
Figure 2:
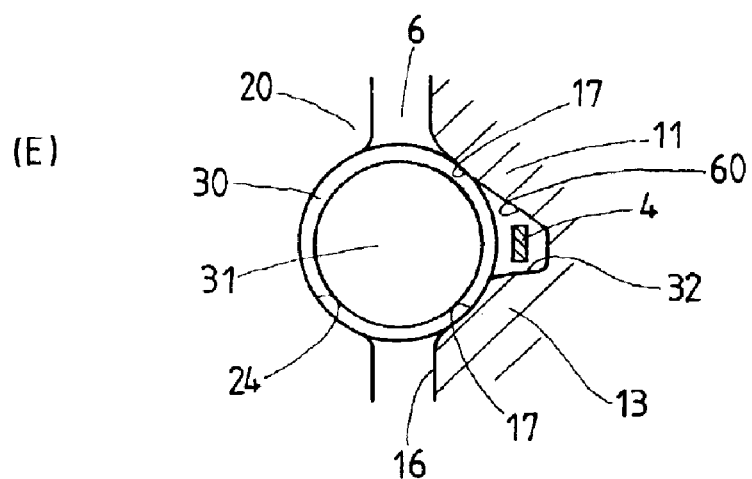
Figure 2:
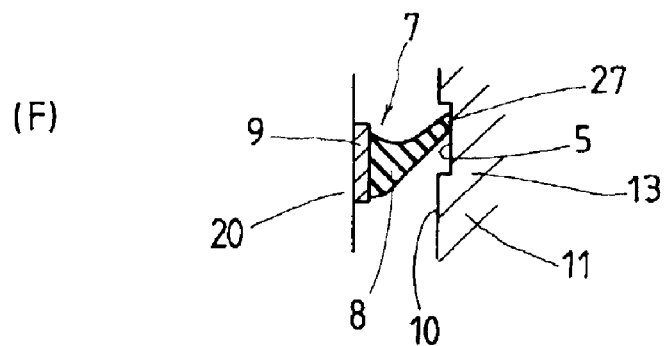
Figure 3:
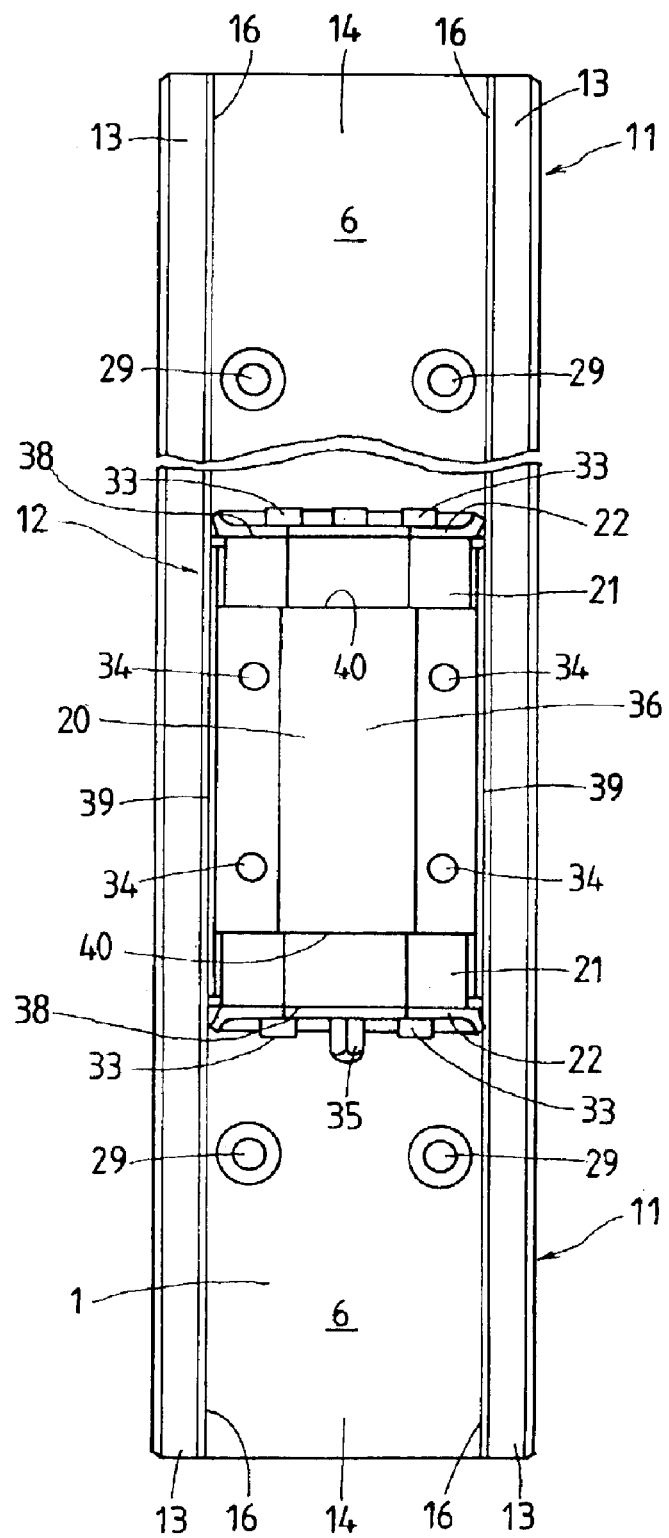
FIG. 3 is a plan view, partially cut away, of the linear motion guide unit shown in FIG. 1.
Figure 5:
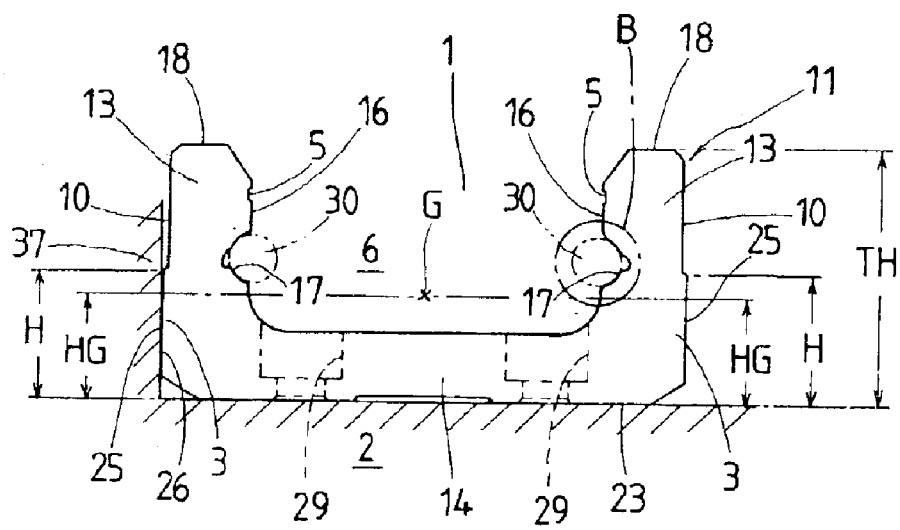
FIG. 5 is a front elevation showing a track rail in the linear motion guide unit of FIG. 1.

On the sidewise opposing inside surfaces 16 of the side walls 13 defining between them the guide channel 6 in the track rail 11, there are each provided just one of the raceway groove 17 extending lengthwise of the track rail 11 and a recess 5 lying in parallel with the raceway groove 17 with made open to the guide channel 6. The side walls 13 are each made on a sidewise outside surface 10 thereof with a bulged portion 3 lying lengthwise of the track rail 11 with outwardly raised above the outside surface 10. The bulged portion 3 is made in a way spreading in width H from a lower surface 23 of the side wall 13 up to a level above the center of gravity G, refer to FIG. 5, of the track rail 11. Atop of the bulged portion 3 there is provided a sidewise outermost surface 25 that is processed to provide a surface of reference, which as shown in FIG. 2 can lie in close contact relation with a mating surface 26 of reference made on a fixed member 37 of reference of the machine bed 2. Although but the bulged portions 3 are usually raised sidewise above the sidewise opposite outside surfaces 10 of the side walls 13 of the track rail 11, one to each outside surface, it will be appreciated that only one of the sidewise outside surfaces 10 of the side walls 13 may be raised outwardly to make the bulged portion 3.

Figure 11:
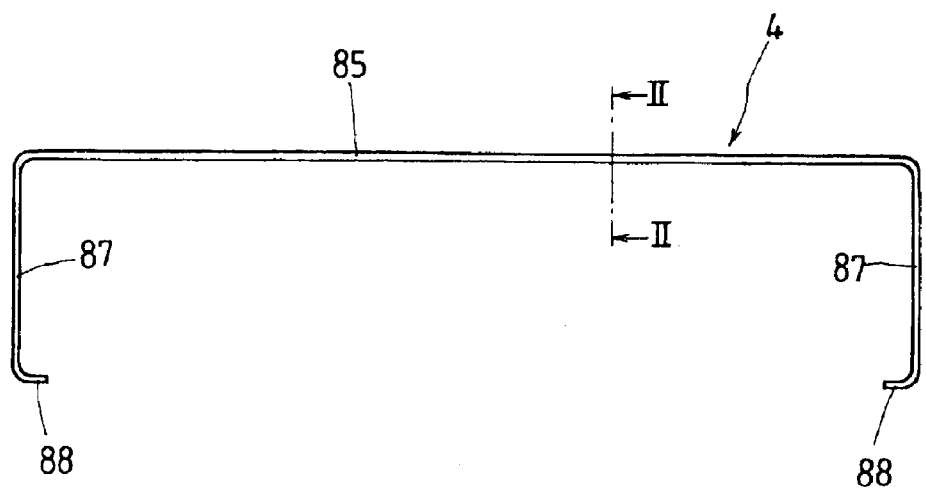
FIG. 11 is a plan view showing a retainer band in the linear motion guide unit of FIG. 1.
Figure 12:
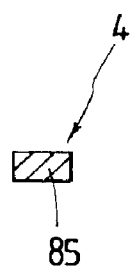
FIG. 12 is a cross section of the retainer band taken along a line II—II of FIG. 11.
Figure 13:
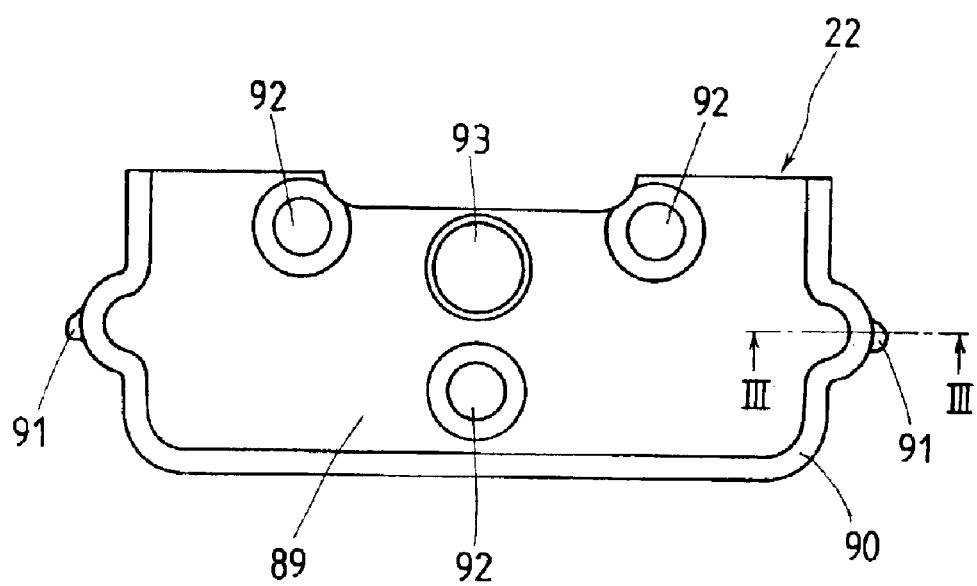
FIG. 13 is a front elevation showing an end seal used in the linear motion guide unit of FIG. 1.

Especially, the linear motion guide unit according to the present invention features that the track rail 11 is made in the form of U-shape in traverse section while the slider 12 has a retainer band 4 to hold the rolling elements 30 in place, and a relief flute 32 is cut deep in the raceway groove 17 of the track rail 11, making it possible to lay the retainer band aside from the raceway groove 17. The retainer band 4 itself as shown in FIGS. 11 and 12, is made of a slender member of flat rectangle in cross section, which is formed into a specific configuration effective to keep the rolling elements 30 against falling apart, even small in cross-sectional area. The retainer band 4 of a slender member is made up of a lengthwise extending major part 85 to hold the rolling elements 30 while they rolling through the load raceway 19, sidewise extending arms 87 of forward and aft ends of the major part 85, which are bent at right angle with the major part 85 to fit in bearing grooves 50 made in the end caps 21, and forward and aft arm tips 88 bent back to extend towards each other along the major part 85, coming into engagement with slots 15 formed in the middle of the end caps 21. The rolling elements 30 are kept in the slider 12 by virtue of the retainer band 4 installed in the slider 12.

On an outside face 38 of the end cap 21, moreover, there are provided with the bearing grooves 50 to fit over the arms 87 or the forward and aft ends of the retainer band 4, which are bent at right angle with the fore-and-aft direction of the retainer band 4. The retainer band 4 is held on the end caps 21 after the forward and aft arm tips 88 of the retainer band 4 has come into engagement with the slots 15 formed in the middle of the end caps 21. A relief flute 32 is cut into a depth of bottom of the raceway groove 17 in a way extending lengthwise of the raceway groove, and the retainer band 4 installed in the slider 12 can fit in the relief flute 32 for travel relative to the raceway groove 17 as the slider 12 moves along the track rail 11.

Figure 6:
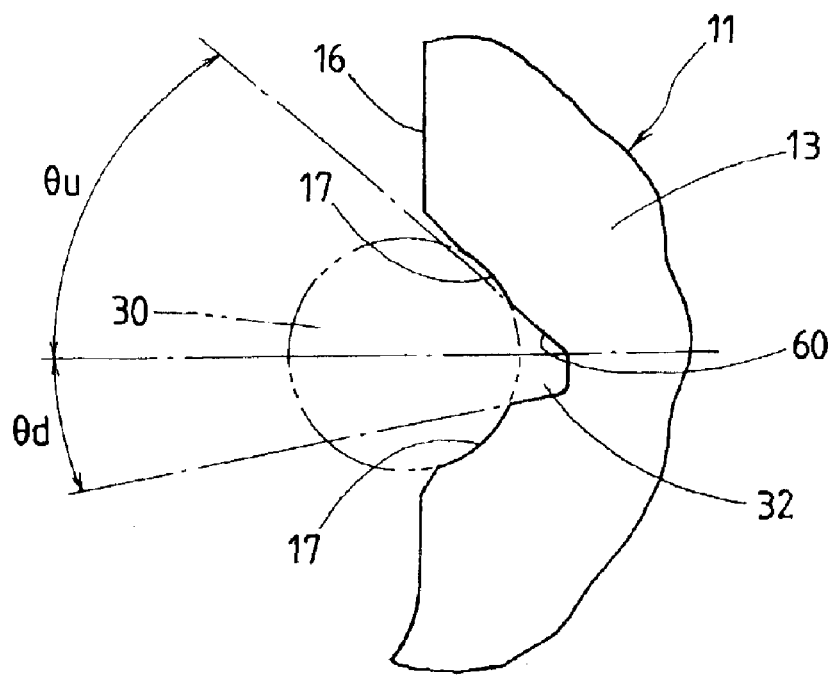
FIG. 6 is a fragmentary enlarged view showing an area encircled with B in FIG. 5.
Figure 14:
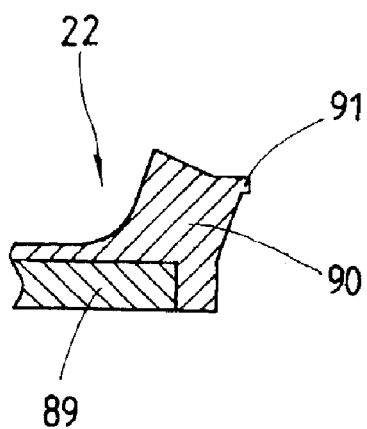
FIG. 14 is a fragmentary cross-section of the end seal taken along a line III—III of FIG. 13.
Figure 15:
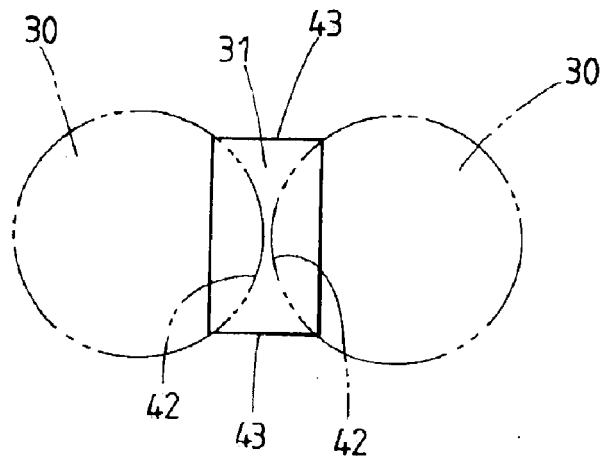
FIG. 15 is a side elevation of a separator built in the recirculating circuit shown in FIG. 4.
Figure 16:
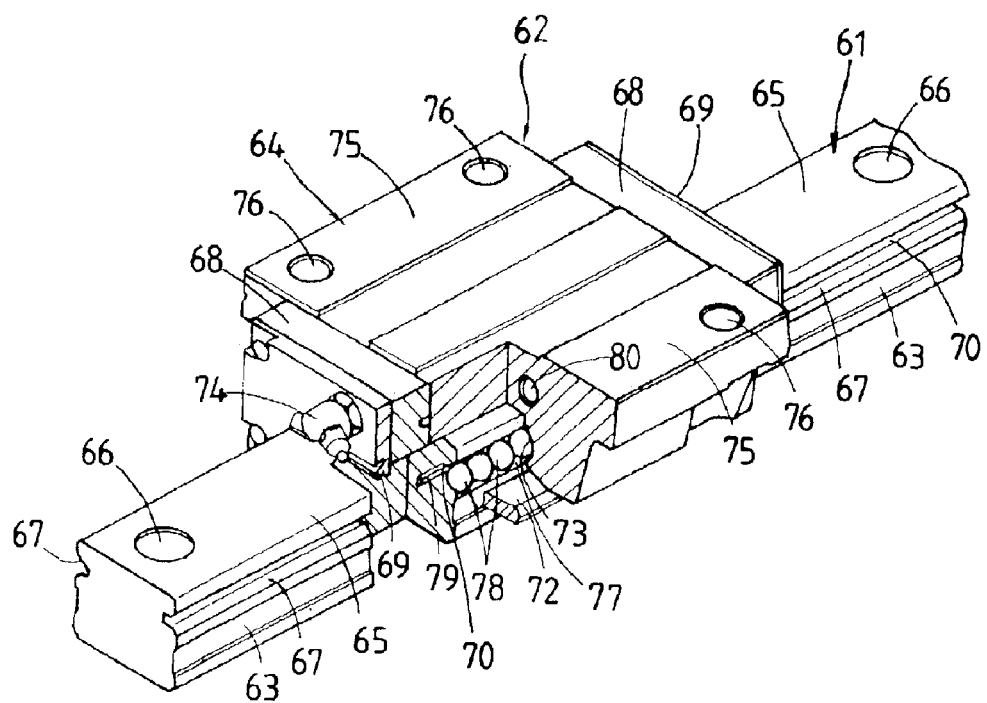
FIG. 16 is a perspective view, partly broken away, of an example of conventional linear motion guide units.

The relief flute 32 where the retainer band 4 is allowed to step aside therein needs to be cut in the track rail 11 together with the associated raceway groove at a time. To do this, the relief flute 32 is cut in a fashion at least one lengthwise flank thereof on the side nearer the upward opening 1 of the track rail 11 is made slantwise to provide a tapered flank 60 because of which the relief flute 32 can be produced together with the associated raceway groove at a single process. As apparent in FIG. 6, the tapered flank 60 of the relief flute 32 lies at an angle θu that is selected to an angular extent where a grinding stone to cut the raceway groove is allowed to enter through the upward opening 1 between the side walls 13 of the track rail 11 without getting any interference from the track rail 11. That is to say, the relief flute 32 is cut in the track rail 11 in such a fashion that the slant angle θu of the upper flank is more than a slant angle θd of a lower flank. This angular relation between the flanks of the relief flute 32 helps make it possible to cut the relief flute 32 at the same time with the raceway groove 17. Cutting the relief flute 32 together with the raceway groove 17 at a time helps make certain of the relief flute 32 that is a minimum in area, but affording to fit over the retainer band 4. Thus, the relief flute 32 may be restricted to an area having a little or negative affect on the strength of the side walls 13 of the track rail 11. Referring to FIG. 14, moreover, a sealing lip 90 affixed to an end seal 22 has a tip 91 reaching into sliding engagement with the depth of the relief flute 32 to close the relief flute 32. Besides, the relief flute 32 is finished to make sure of smooth sliding engagement with the lip 90 of the end seal 22.

When considering laying the track rail 11 on a jig serving as the fixed base of reference for machining and examining the track rail 11, the track rail 11 would be allowed to lie steady down on the fixed base of reference or the flat plane of jig without toppling down because the bulged portion 3 is made so wide or large in width H as to spread across the center of gravity G of the track rail 11 above a height HG of the center of gravity. The construction stated earlier makes certain that the track rail 11 can be processed and examined in steady situation, making certain of the accuracy of the processing and examining with good stability. Processes used to manufacture the track rail 11 include, for example grinding operation to make a surface 25 of reference on the bulged portion 3, reforming operation for relieving any stress that might be caused by hardening of the track rail 11, and so on. It will be preferred that the bulged portion 3 out of the side wall 13 has the width H that spreads across the center of gravity G of the track rail 11 considering any tolerance. By contrast, in case where the bulged portion 3 is made too large, the area where the surface 25 of reference comes in close contact with a mating surface 26 of reference made on a fixed member 37 of reference would get too wide to ensure the accuracy. Thus, the width H of the surface of reference recommended curbing any negative influence on the accuracy is at most up to half the overall height TH of the track rail 11.

The slider 12 is mainly comprised of a carriage 20 made on widthwise opposite sides thereof with raceway grooves 24, one to each side, which are arranged in opposition to their associated raceway grooves 17 lying on inside surfaces 16 of the side walls 13 of the track rail 11, end caps 21 arranged on forward and aft ends 40 of the carriage 20, one to each end, end seals 22 attached on outside faces 38 of the end caps 21, one to each cap, and rolling elements 30 of balls allowed to run through load raceways 19 each of which is defined between any one of the raceway grooves 24 on the carriage 20 and the associated one of the raceway grooves 17 on the side walls 13 of the track rail 11. The end caps 21 and end seals 22 are tightened together to the carriage 20 by means of machine screws 33, which are screwed into many threaded holes 34 bored in the carriage 20. The slider 12 is allowed to slide smoothly with respect to the track rail 11 as the rolling elements 30 run through the load raceways 19.

Figure 4:
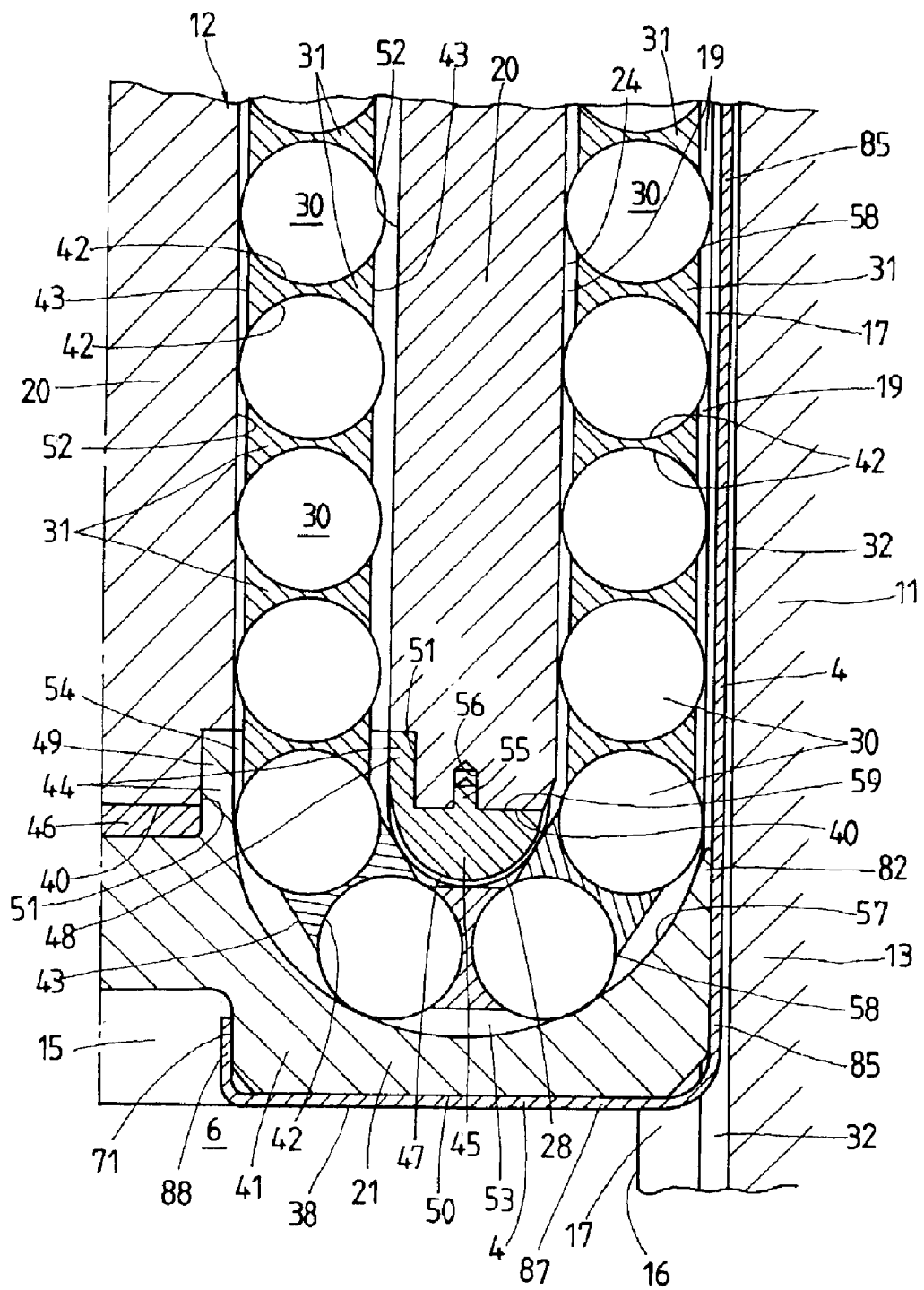
FIG. 4 is a fragmentary enlarged view in section illustrating the functional relation among a carriage, end cap and spacer in the linear motion guide unit of FIG. 1, which in combination provide a recirculating circuit for the travel of a slider.

The end cap 21, as shown in FIG. 4, is provided on sidewise opposite sides thereof with leading beaks 82, one to each side, which fit in the relief flutes 32 of the track rail 11 to allow the rolling elements 30 together with separators 31 to transfer smoothly from the load raceways 19 to turnarounds 53 and vice verse. It is preferable that the separator 31 is made as large in size as possible, for example in a size accounting for 85% or so of the diameter of the rolling element 30 in order to curb noise and rattling sound that might occur when the rolling elements 30 move. The leading beak 82 helps connect continuously between the load raceway 19 and the associated turnaround 53, making sure of noiseless smooth transfer of the rolling elements 30 together with the separators 31 from the load raceway 19 to the turnaround 53 and vice verse.

The carriage 20 is made in the form of, for example a substantially rectangular parallelepiped having a width that may be nested snugly in the track rail 11. The carriage 20 is made as reduced as possible in height likewise with the track rail 11 to render the linear motion guide unit small and compact in construction. The carriage 20 usually has thereon a slider head extending upward above top faces 18 of the side walls 13 of the track rail 11, while the height of the slider head above the top faces 18 of the side walls 13 is preferably curbed as low as possible, although depending on what type of table or instrument is mounted on the slider 12. Thus, the slider 12 constructed as stated earlier and the track rail 11 conjoin to help make the linear motion guide unit much compact or slim in construction and further allow greater freedom in design of peripheral equipment including any drive means of the ball-screw drive or motor for moving the slider 12 relatively to the track rail 11, helping contribute to shrinkage of machinery or apparatus to which the linear motion guide unit is applied.

Figure 7:
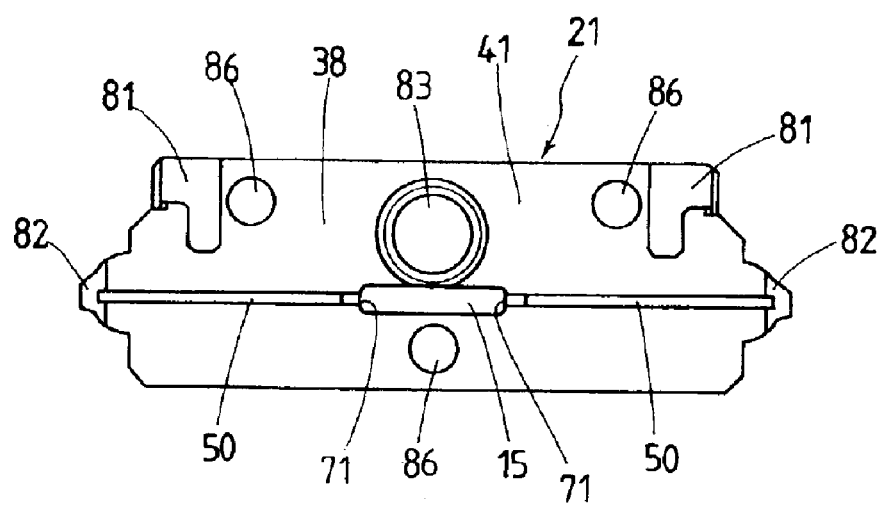
FIG. 7 is a front elevation showing an end cap used in the linear motion guide unit of FIG. 1.
Figure 8:
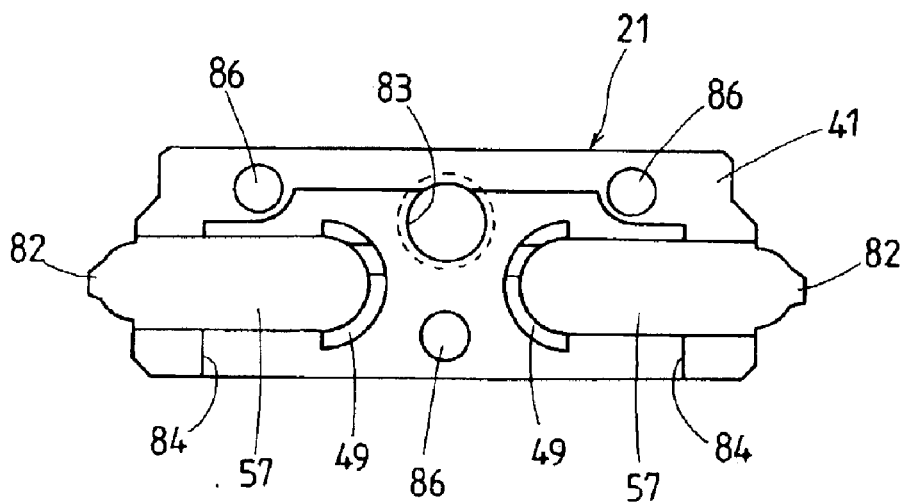
FIG. 8 is a rear elevation of the end cap of FIG. 7.
Figure 9:
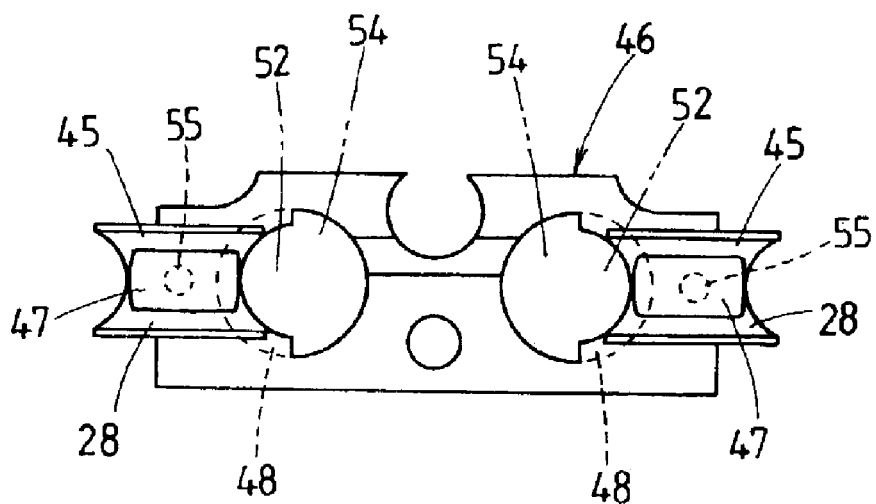
FIG. 9 is a front elevation of a spacer that will fit with the back of the end cap shown in FIG. 8.
Figure 10:
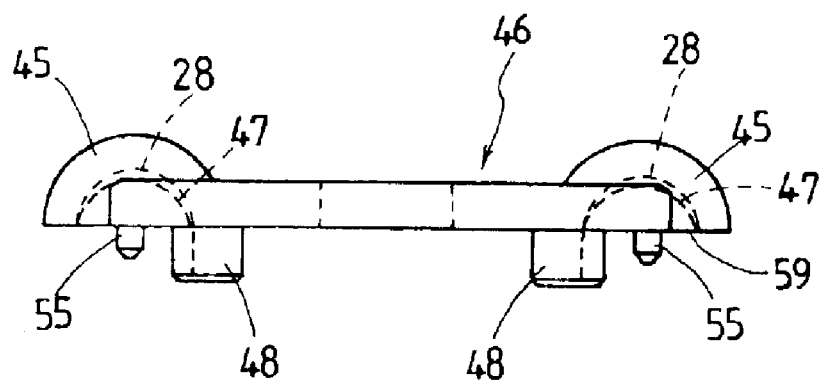
FIG. 10 is a bottom view showing the spacer of FIG. 9.

The slider 12, as illustrated in FIGS. 1 and 2, has mounted with upper seals 7 that serve the function of protecting the load raceways 19 defined between raceway grooves 24 on the carriage 20 of the slider 12 and the associated raceway grooves 17 on the track rail 11 against foreign matter including dust and dirt, which might be invasive from above. To this end, the upper seals 7 are each fit in the slider 12 so as to lie between any one of fore-and-aft side surfaces 39 of the slider 12 and the associated lengthwise inside surface 16 on the side wall 13 of the track rail 11. The upper seal 7 is constructed as shown in FIGS. 1 and 2(E), and comprised of a metal backing plate 9 arranged in a manner coming in abutment along one lengthwise edge thereof against the carriage 20 and at forward and aft ends thereof against end caps 21, and an elastic member 8 with the lip 27 fastened to the metal backing plate 9. With the upper seal 7 constructed as stated earlier, the metal backing plate 9 is bent at forward and aft ends that are to come into engagement with recessed mating areas 81, refer to FIG. 7, which are formed on the outside faces 38 of the end caps 21. The forward and aft bent ends of the backing plate 9 are each clamped between the outside face 38 of the end cap 21 and the end seal 22.

The elastic member 8 in the upper seal 7 has a lengthwise lip 27 that gets caved on an upper surface thereof, for example as shown in FIG. 2(F), providing a specific lip shape tapered towards a depth of a recess 5 cut lengthwise in the track rail 11. Thus, the upper seal 7 would come into sliding fit at only the lip 27 in the recess 5 on the side wall 13, ideally with less or no clearance remaining between them. This close relation of the lip 27 with the recesses 5 helps get reducing the sliding resistance that might be encountered when the slider 12 moves relatively to the track rail 11, even with keeping the load raceway 19 against invasive foreign matter including dust and dirt.

Upon production of the track rail 11, the lengthwise recesses 5 are made in parallel with the raceway grooves 17 on the inside surfaces 16 of the side walls 13 of the track rail 11 and at the same time cutting the raceway grooves 17 in the inside surfaces 16. That is, the recesses 5 are cut simultaneously with the raceway grooves 17 in the inside surfaces 16 on the side walls 13. Simultaneous cutting of the recesses 5 with the raceway grooves 17 of the track rail 11 helps make sure of evenly sliding engagement of the upper seals 7 with the lengthwise recesses 5 of the track rail 11 to expect the smooth travel of the slider 12.

The end caps 21 are attached to the forward and aft ends 57 of the carriage 20, one to each end, and made therein with the turnarounds 53 to allow the rolling elements 30 to turn round from the load raceways 19 to the return passages 52 and vice versa. The end caps 21 are each provided therein with a port 83 ready for the grease nipple 35 and some threaded holes 86 for machine screws 33. The end caps 21 are each made up of, for example a spacer 46 to be fastened on any one of the forward and aft ends 40 of the carriage 20 and a major end-cap part 41 to be installed on the carriage 20 in a way interposing the spacer 46 between the carriage 20 and the major end-cap part 41. The spacer 46 has a spacer lug 45 that is to define a radially inside curved half 28 of the turnaround 53 while the major end-cap part 41 is made therein with a curved outside half 57 of the turnaround 53. The spacer 46 is constructed to fit in a recess 84 of the associated major end-cap part 41. The major end-cap part 41 is integrally provided thereon with a tubular connector 44 extending in alignment with the turnaround 53 in the end cap 21. Upon assembling the end cap 21 with the carriage 20, the tubular connector 44 fits in the associated return passage 52 at bounds where the turnaround 53 in the end cap 21 comes into abutment against the associated return passage 52 in the carriage 20, making sure of smooth recirculation of the rolling elements 30.

As the spacer lug 45 is constructed integrally with the spacer 46, just putting the spacer 46 in the recess formed in the major end-cap part 41 results in joining them together with one another thereby producing a complete turnaround 53. Along the middle depths of the radially inside curved half 28 prepared on the spacer lug 45 for the production of the turnaround 53, moreover, there is cut a relief gutter 47 to avoid any interference of the separator 31 with the radially inside curved surface of the turnaround 53. A positioning pin 55 to set the spacer 46 with the spacer lug 45 in precise location with respect to the carriage 20 is made on the back 59 of the spacer lug 45, which is to mate with any one of the forward and aft ends 40 of the carriage 20. Upon assembling the end caps 21 with the carriage 20, the positioning pins 55 fit in matching holes 56 formed in the ends 40 of the carriage 20. The major end-cap part 41 has an outside half 49 of the tubular connector 44, which is to fit in a socket 54 at any one of forward and aft open ends of the return passage 52 in the carriage 20 while the spacer 46 has an inside half 48 of the tubular connector 44, which is to fit in a socket 54 at any one of forward and aft open ends of the return passage 52 in the carriage 20. The inside and outside halves 48, 49 mate with one another and extend through an associated open end 51 into the carriage 20 to connect the turnaround 53 with the return passage 52.

The end seals 22 are moreover made at preselected locations thereof with an opening 93 where the grease nipple 35 is led through there, and some holes 92 where the machine screws 33 extend through there to be screwed into the carriage 20. The end seals 22 have the lip 90 arranged in alignment with the raceway grooves 17 to plug up forward and aft ends of the load raceways 19, and a metal backing plate 89 having attached thereon the lip 90.

Rolling elements, or balls 30, are to run through recirculating circuits as the slider 12 travels relatively to the track rail 11. The recirculating circuits are each comprised of the load raceway 19 defined between the confronting raceway grooves 17, 24, and a non-loaded area made up of a return passage 52, refer to FIGS. 2 and 4, bored in the carriage 20 and the turnarounds 53, refer to FIG. 4, formed in the end caps 21 to communicate the load raceway 19 with the return passage 52. The slider 12 has a grease nipple 35 for applying externally lubricant to the recirculating circuit, which is attached to slider 12, with extending outside from the associated end seal 22. With the embodiment discussed here, the separator 31 is shown as being interposed between any two adjacent rolling elements 30 running through the recirculating circuit. The separator 31 has a circular periphery 43 and axially opposing end faces 42 made concaved to fit over the adjacent rolling elements or ball 30, one to each end face. On the other hand, the relief gutter 47 extending along the curvature of the turnaround 53 is cut deep in the radially inside curved surface 28 of the turnaround 53 in the end cap 21 to avoid any interference of the separator 31 with the radially inside curved surface of the turnaround 53. Thus, the separator 31 makes certain of noiseless rolling of the rolling elements 30 without occurring collision of rolling elements 30 against one another.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A linear motion guide unit comprising; a track rail having a pair of side walls extending lengthwise in parallel with one another, the side walls being made on their sidewise opposing inside surfaces with first raceway grooves, one to each inside surface; a slider movable lengthwise along the track rail in a guiding way made open between the side walls of the track rail, the slider being made thereon with second raceway grooves in opposition to the first raceway grooves; and rolling elements running through a load raceway defined between the confronting first and second raceway grooves; wherein a retainer band is installed in the slider to keep the rolling elements in the slider, while a relief flute is cut deep in the first raceway grooves in a way extending lengthwise along the first raceway groove, and wherein the retainer band on the slider fits in the relief flute for relative movement as the slider travels relatively to the track rail, wherein the relief flute has an upper tapered flank and a lower tapered flank such that a slant angle of the upper tapered flank is more than a slant angle of the lower tapered flank.

2. A linear motion guide unit constructed as defined in claim 1 wherein the relief flute where the retainer band is allowed to step aside therein is cut together with the associated raceway groove at a time.

3. A linear motion guide unit constructed as defined in claim 1 wherein the track rail is comprised of a pair of side walls and a bottom connected integrally with the side walls along lower edges of the side walls to define an upward opened recess of U-shape in cross section.

4. A linear motion guide unit constructed as defined in claim 1 wherein the first raceway grooves are cut in sidewise opposing inside surfaces of the side walls of the track rail, just one to each inside surface.

5. A linear motion guide unit constructed as defined in claim 1 wherein a separator is installed between any two adjacent rolling elements.

6. A linear motion guide unit constructed as defined in claim 1 wherein the slider is comprised of a carriage made on widthwise opposite sides thereof with the second raceway grooves, one to each side, end caps arranged on forward and aft ends of the carriage, and end seals attached on outside faces of the end caps, one to each cap.

7. A linear motion guide unit constructed as defined in claim 6 wherein forward and aft ends of the retainer band are bent at right angle with a lengthwise direction of the retainer band to provide bent ends each of which fits in a groove cut in the outside face of the end cap.

8. A linear motion guide unit constructed as defined in claim 7 wherein tips of the bent ends of the retainer band is bent back to extend towards each other along the lengthwise direction of the retainer band, coming into engagement with a slot formed in the middle of the end cap.

9. A linear motion guide unit constructed as defined in claim 1 wherein the track rail is to be fastened to a fixed bed, and the side walls of the track rail are each made on sidewise outside surface thereof with a bulged portion having a width across from a lower surface of the side wall to a level above the center of gravity of the track rail, the bulged portion having a surface finished in a surface of reference matching a mating surface of reference on the fixed bed.

10. A linear motion guide unit constructed as defined in claim 1 wherein the slider has an upper seal to close a clearance left between a fore-and-aft side of the slider and a lengthwise inside surface of any one of the side walls of the track rail, while a recess is cut in the inside surface of the side wall in a way extending lengthwise of the track rail so as to allow the upper seal to come in sliding contact at a lip thereof with the recess.

11. A linear motion guide unit constructed as defined in claim 10 wherein the lengthwise recesses are made in parallel with the raceway grooves on the inside surfaces of the side walls of the track rail and at the same time cutting the raceway grooves in the inside surfaces.

12. A linear motion guide unit constructed as defined in claim 10 wherein the upper seal is comprised of a metal backing plate arranged in a manner coming in abutment against the carriage and the end caps, and an elastic member with the lip fastened to the metal backing plate.

13. A linear motion guide unit constructed as defined in claim 1 wherein the carriage is made therein with a return passage where the rolling elements are allowed to run through there; the end cap is made therein a turnaround to connect the load raceway to the return passage, getting the rolling elements turning about there in their running direction; the separator is interposed between any two adjacent rolling elements to travel accompanied with the rolling elements, the separator having a circular periphery and axially opposing end faces made concaved to fit over the adjacent rolling elements, one to each end face; and a relief gutter extending along a curvature of the turnaround is cut deep in an inside circular surface of the turnaround in the end cap to avoid any interference of the moving separator with the turnaround.

14. A linear motion guide unit constructed as defined in claim 13 wherein the end cap is provided on sidewise opposite sides thereof with leading beak, one to each side, which fit in the relief flutes of the track rail to make sure of smooth transfer of the rolling elements between the load raceways and the turnarounds.

15. A linear motion guide unit constructed as defined in claim 13 wherein the end cap is composed of a spacer to be fastened on any one of the forward and aft ends of the carriage and a major end-cap part to be installed on the carriage in a way interposing the spacer between the carriage and the major end-cap part, and wherein the spacer has a spacer lug to define a radially inside curved half of the turnaround while the major end-cap part is made therein with a radially outside curved half of the turnaround.

16. A linear motion guide unit constructed as defined in claim 15 wherein the major end-cap part has an outside half of a tubular connector, which is to fit in a socket at any one of forward and aft open ends of the return passage in the carriage while the spacer has an inside half of the tubular connector, which is to fit in a socket at any one of forward and aft open ends of the return passage in the carriage, and wherein the inside and outside halves mate with one another to communicate with the return passage.

17. A linear motion guide unit constructed as defined in claim 13 wherein the spacer lug is constructed integrally with the spacer, so that just putting the spacer in a recess formed in the major end-cap part results in joining them together with one another thereby producing the turnaround.

18. A linear motion guide unit constructed as defined in claim 13 wherein the relief gutter extending along the curvature of the turnaround is cut deep in the middle of the radially inside curved surface of the turnaround, which is formed on the spacer lug of the spacer.

19. A linear motion guide unit constructed as defined in claim 13 wherein a positioning pin to set the spacer with the spacer lug in precise location with respect to the carriage is made on the back of the spacer lug, which is to mate with any one of the forward and aft ends of the carriage, and wherein the positioning pins fit in matching holes formed in the ends of the carriage.

20. A linear motion guide unit constructed as defined in claim 1 wherein the bottom of the track rail is made therein with bolt holes, in which bolts fit to fasten the track rail to the bed, while the slider is provided at an upper surface thereof with threaded holes that are used to fasten a table thereto.

* * * * *